United States Patent
Guo et al.

(10) Patent No.: US 11,049,159 B1
(45) Date of Patent: Jun. 29, 2021

(54) SYSTEMS AND METHODS FOR REGULATING ONLINE MERCHANDISE LINK ACTIVITY

(71) Applicant: Coupang, Corp., Seoul (KR)

(72) Inventors: Hongyu Guo, Shanghai (CN); Gang Yu, Shanghai (CN); Xinqi Yu, Shanghai (CN); Weiwei Shen, Shanghai (CN)

(73) Assignee: Coupang Corp, Seoul (KR)

( * ) Notice: Subject to any disclaimer, the term of this patent is extended or adjusted under 35 U.S.C. 154(b) by 0 days.

(21) Appl. No.: 16/822,273

(22) Filed: Mar. 18, 2020

(51) Int. Cl.
| | |
|---|---|
| G06Q 30/00 | (2012.01) |
| G06Q 30/06 | (2012.01) |
| G06Q 10/10 | (2012.01) |
| G06F 16/28 | (2019.01) |
| G06Q 50/26 | (2012.01) |
| G06F 16/958 | (2019.01) |

(52) U.S. Cl.
CPC ....... *G06Q 30/0609* (2013.01); *G06F 16/285* (2019.01); *G06F 16/958* (2019.01); *G06Q 10/10* (2013.01); *G06Q 30/0185* (2013.01); *G06Q 30/0633* (2013.01); *G06Q 50/265* (2013.01)

(58) Field of Classification Search
CPC .................................................. G06Q 30/0609
See application file for complete search history.

(56) References Cited

U.S. PATENT DOCUMENTS

| | | | |
|---|---|---|---|
| 7,797,197 B2 | 9/2010 | Kumar et al. | |
| 8,321,269 B2 | 11/2012 | Linden et al. | |
| 10,129,288 B1 * | 11/2018 | Xie | ..................... H04L 63/1416 |
| 10,475,084 B2 * | 11/2019 | Stoliartchouk | ....... G06F 16/958 |

(Continued)

FOREIGN PATENT DOCUMENTS

| | | |
|---|---|---|
| JP | 2015-170219 A | 9/2015 |
| KR | 1020100057192 A | 5/2010 |

(Continued)

OTHER PUBLICATIONS

Snyder, Peter, and Chris Kanich. "Characterizing fraud and its ramifications in affiliate marketing networks." Journal of Cybersecurity 2.1 (2016): 71-81.*

(Continued)

*Primary Examiner* — Kathleen Palavecino
(74) *Attorney, Agent, or Firm* — Finnegan, Henderson, Farabow, Garrett & Dunner LLP

(57) ABSTRACT

A system for regulating online merchandise link activity. The system may comprise a memory storing instructions and at least one processor configured to execute the instructions. The instructions may comprise: maintaining a set of items for online link processing, the items being associated with a website; selecting a first item from the set of items; receiving an electronic request from a first affiliate system related to the first item; registering the first affiliate system as associated with the first item; generating an online link associated with the first item and the registered affiliate system; detecting an actuation of the online link, the actuation being associated with digital activity; and, based on the detected actuation and digital activity, permitting or denying the first affiliate system from operating the online link.

18 Claims, 8 Drawing Sheets

(56) References Cited

U.S. PATENT DOCUMENTS

| | | | | |
|---|---|---|---|---|
| 2006/0136294 A1* | 6/2006 | Linden | ............... | G06Q 30/0257 705/14.47 |
| 2010/0010887 A1* | 1/2010 | Karlin | ................ | G06Q 30/0213 705/14.15 |
| 2012/0310734 A1 | 12/2012 | Messer | | |
| 2012/0316937 A1* | 12/2012 | Lotan | ..................... | G06Q 30/02 705/14.16 |
| 2013/0311211 A1* | 11/2013 | Zafar | ..................... | G06Q 10/02 705/5 |
| 2015/0127438 A1* | 5/2015 | Wedderburn | ...... | G06Q 30/0214 705/14.16 |

FOREIGN PATENT DOCUMENTS

| | | |
|---|---|---|
| KR | 1020110124653 A | 11/2011 |
| KR | 1020140146700 A | 12/2014 |
| KR | 1020170101069 A | 9/2017 |
| KR | 1020180027246 A | 3/2018 |

OTHER PUBLICATIONS

Decision of Patent Grant for Korean Application No. 10-2020-0055368, dated Nov. 27, 2020, 2 pages.

English-Language Translation—Decision of Patent Grant for Korean Application No. 10-2020-0055368, dated Nov. 27, 2020, 2 pages.

Notice of Preliminary Rejection for Korean Application No. 10-2020-0055368, dated Sep. 19, 2020, 5 pages.

English-Language Translation—Notice of Preliminary Rejection for Korean Application No. 10-2020-0055368, dated Sep. 19, 2020, 5 pages.

Search Report for Korean Application No. 10-2020-0055368, dated Aug. 10, 2020 (10 pages).

International Search Report for PCT/IB2020/062334, dated Apr. 1, 2021.

Written Opinion of the International Searching Authority for PCT/IB2020/062334, dated Apr. 1, 2021.

* cited by examiner login Sign Up Service center

| Category | Cheese | ? | 🛒 |

My Orders Shopping Cart all 'Cheese' (65,586)          Gift Cards filter

65,586 results for 'Cheese'
Related searches: <u>Sliced cheese</u>  <u>baby cheese</u>  <u>cheddar cheese</u>  <u>string cheese</u>  <u>butter</u>  <u>pizza cheese</u>  <u>cream cheese</u>  <u>cheese stick</u>  <u>cubed cheese</u>  <u>parmesan cheese</u>

☐ Fast Delivery
☐ Imported Product 6 per page category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more

| CHEDDAR | LOCAL FARM MILK | |
|---|---|---|
| FREE Shipping<br>Sliced cheese, 18g, 100 pieces<br>(88 won per 10 g)<br>Morning (Thursday) | Mozzarella cheese, 1kg, 2 pieces<br>🚀<br>(103 won per 10 g)<br>Tomorrow (Wed) | 100 grams of cheddar sliced cheese,<br>18 grams, 100 pieces<br>(73 won per 10 g)<br>Morning (Thursday) |
| (1294) | (285) | (862) |
| REAL GRATED PARMESAN | | Cheese Heads String |
| Grated Parmesan Cheese, 85g, 1 piece<br>🚀<br>(389 won per 10g)<br>Tomorrow (Wed) | Mozzarella cheese, 1 kg, 1<br>(85 won per 10g)<br>Morning (Thursday) | FREE Shipping<br>1.36 kg of string cheese<br>Morning (Thursday) |
| (839) | (379) | (337) |

*FIG. 4A*

Favorites Application        login  Sign Up  Service center

[all]

My Account  Shopping Cart

Shipments  Fast Shipments  Christmas  Gold deals  Regular delivery  Events / Coupons  Planned Exhibition  Gift Cards Home > Food > Daily products / ice cream > Cheese > Fresh cheese > Mozzarella mozzarella cheese
285 Reviews
20,000 KRW
FREE Shipping
Tomorrow (Wed) 11/28 Arrival Guarantee — 411
Seller: Farm Imports Inc. [See Other Sellers]
Weight per piece x Quantity : 1kg x 2 pieces

[ 1 ]  [ Add to cart ]  [ Buy now ]

- Country of origin: See product description
- Shelf Life: 2019-11-04
- Total quantity: 2
- Cheese form: crushed (powder)
- Item Number: 132160831 - 388790651

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |
|---|---|---|---|

Required notation information

| | | | |
|---|---|---|---|
| Type of food | Natural cheese / frozen products | Producers and Locations | Cheese Corp. / Republic of Korea |
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

*FIG. 4B*

SYSTEMS AND METHODS FOR REGULATING ONLINE MERCHANDISE LINK ACTIVITY

TECHNICAL FIELD

The present disclosure generally relates to computerized systems and methods for regulating online merchandise link activity. In particular, embodiments of the present disclosure relate to inventive and unconventional systems that enable regulation of online merchandise link activity, including click, affiliate, or order activity, as well as determination of legitimate or fraudulent behavior related to the activity.

BACKGROUND

Affiliate marketing is a mechanism employed by businesses to assist with marketing of business products. Affiliates earn rewards or commissions based on the commercial success of the business products they market. Online marketing is one large-scale avenue where businesses rely on affiliates. A business, for example, generates merchandise for sale to customers. An affiliate system then registers as associated with the merchandise and generates a merchandise link for online customers. Customers will visit the merchandise link and, if a purchase of the merchandise is made, the business and affiliate system will settle on commission associated with the purchased merchandise.

Problems can arise in online marketing and consumerism when online activity becomes fraudulent. For example, fraudulent affiliate activity has frequently been detected as well as fraudulent click or order activity associated with customers. Cookie stuffing, auto browsing, or order abuse are among the fraudulent types of activity most commonly detected in the context of online consumerism.

As such, there is a need for a system that both enhances detection of fraudulent behavior in the context of online consumerism and also improves the efficiency of detecting such fraudulent behavior. The present invention is, accordingly, directed to mechanisms of preventing fraudulent activity in online marketing and consumerism.

SUMMARY

One aspect of the present disclosure is directed to a system for regulating online merchandise link activity. The system may comprise a memory storing instructions and at least one processor configured to execute the instructions. The instructions may comprise: maintaining a set of items for online link processing, the items being associated with a website; selecting a first item from the set of items; receiving an electronic request from a first affiliate system related to the first item; registering the first affiliate system as associated with the first item; generating an online link associated with the first item and the registered affiliate system; detecting an actuation of the online link, the actuation being associated with digital activity; and, based on the detected actuation and digital activity, permitting or denying the first affiliate system from operating the online link.

Another aspect of the present disclosure is directed to a system for regulating online merchandise link activity. The system may comprise a memory storing instructions and at least one processor configured to execute the instructions. The instructions may comprise: maintaining a set of items for online link processing, the items being associated with a website; selecting a first item from the set of items; receiving an electronic request from a first affiliate system related to the first item; registering the first affiliate system as associated with the first item; generating an online link associated with the first item and the registered affiliate system; detecting an actuation of the online link, the actuation being associated with digital activity; and, based on the detected actuation and digital activity, permitting or denying the first affiliate system from operating the online link; wherein permitting or denying the first affiliate system from operating the online link further comprises sending a communication to a second system operated by a fraud operations team, the communication being based on the digital activity; and receiving, from the second system, an indication as to whether the digital activity represents fraudulent behavior or legitimate behavior.

Other systems and methods are also discussed herein.

BRIEF DESCRIPTION OF THE DRAWINGS

FIG. 4A depicts a sample Search Result Page (SRP) that includes one or more search results satisfying a search request along with interactive user interface elements, consistent with the disclosed embodiments.

FIG. 4B depicts a sample Single Detail Page (SDP) that includes a product and information about the product along with interactive user interface elements, consistent with the disclosed embodiments.

DETAILED DESCRIPTION

Figure 1A:
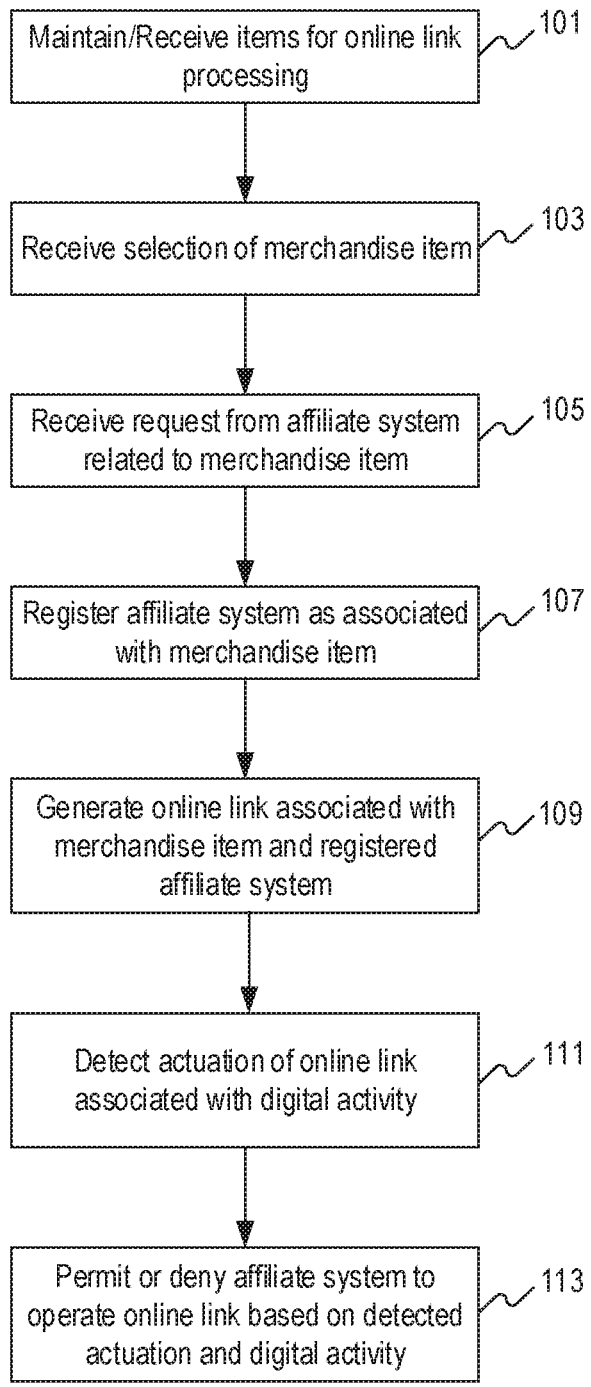
FIG. 1A is a flowchart of an exemplary computerized system for registering an affiliate system as associated with online merchandise and regulating online merchandise activity, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for regulating online merchandise link activity associated with affiliate systems.

FIG. 1A, depicts a flowchart illustrating an exemplary computerized method 100 for registering an affiliate system as associated with online merchandise and regulating online merchandise activity, consistent with the disclosed embodiments. Method 100 begins at step 101. In step 101, a computer system (e.g., External Front End System 303 or Internal Front End System 305) may be configured to receive and maintain merchandise items for online link processing. For example, the computer system may receive merchandise items and store them in a database for online link processing. Alternatively, the computer may maintain the merchandise items by storing them in an application or cloud storage program. In other embodiments, the computer system may receive the items and maintain them in some other capacity for online link processing.

Figure 4C:
FIG. 4C depicts a sample Cart page that includes items in a virtual shopping cart along with interactive user interface elements, consistent with the disclosed embodiments.

The method may then proceed to step 103. In step 103, the computer system may receive a selection of a particular merchandise item. For example, a user may utilize a mouse on a user device, such as 302A, to select an item on a webpage, such as that displayed in FIG. 4B. Alternatively, the user may select the item through an application on the user device.

The method may then proceed to step 105. In step 105, the computer system may receive a request from an affiliate system related to the merchandise item. For example, the affiliate system may request to market the merchandise item by coordinating with a business that produces the merchandise item. In certain embodiments, the affiliate system may specialize in marketing the particular merchandise item.

The method may then proceed to step 107. In step 107, the computer system may register the affiliate system as associated with the merchandise item. For example, the computer system may make an entry in a database (e.g., connected to seller portal 307) associating the affiliate system with the merchandise item. Alternatively, the computer system may link the affiliate system with the merchandise item by some other mechanism.

The method may then proceed to step 109. In step 109, the computer system may generate an online link as associated with the merchandise system and registered affiliate system. For example, the computer system may generate an online link with randomized numbers and/or letters. Alternatively, the computer system may generate an online link with numbers and/or letter organized in a specific fashion. In certain embodiments, the online link may have sort of sequential identifier. In certain specific embodiments, the online link may be an HTTP link.

Figure 1B:
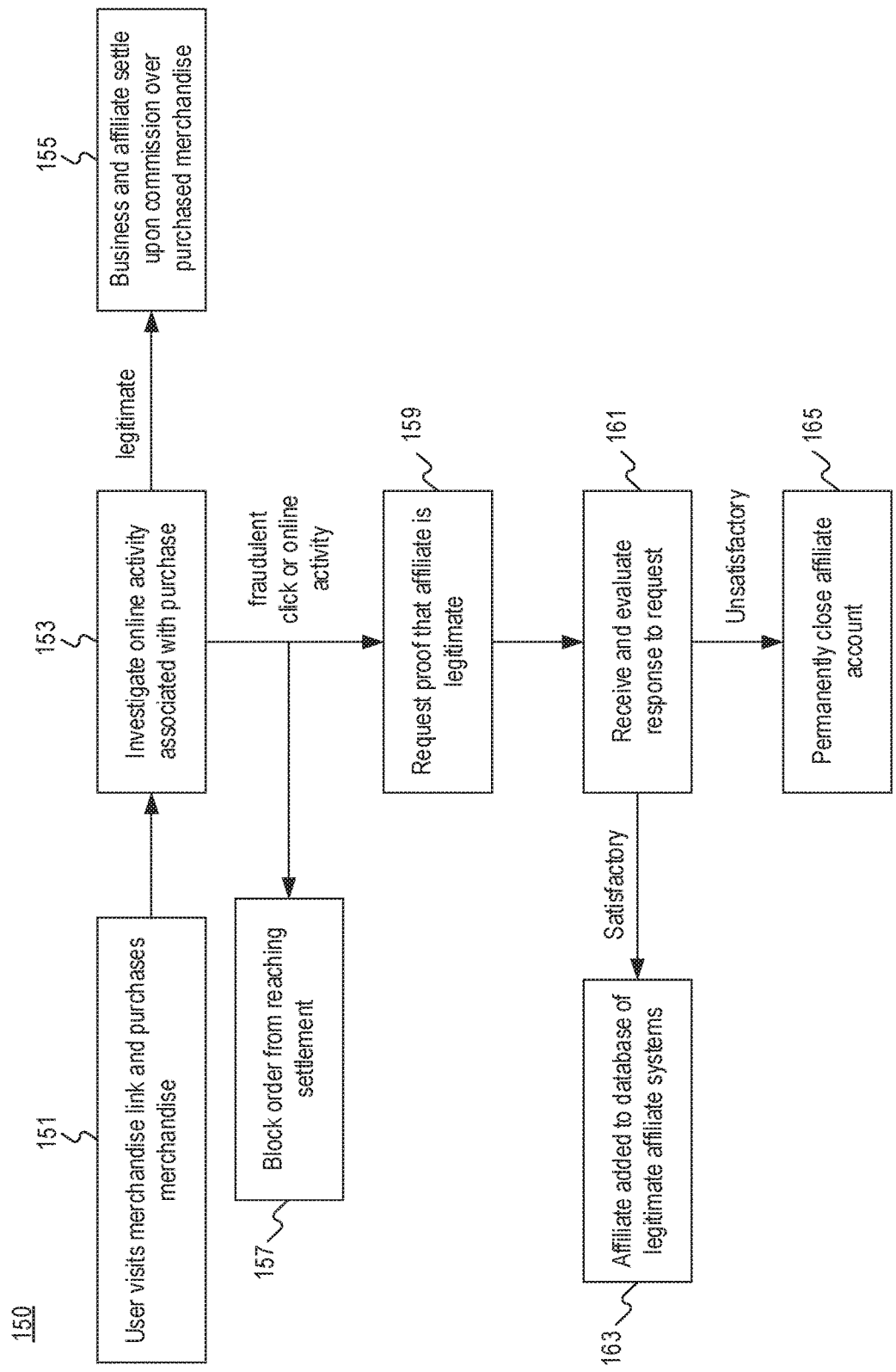
FIG. 1B depicts a flowchart of an exemplary computerized system for detecting legitimate or fraudulent online activity and affiliate systems, consistent with the disclosed embodiments.

The method may then proceed to step 111. In step 111, the computer system may detect actuation of the online link associated with digital activity. For example, as illustrated in FIG. 1B, a computer system may detect a user visiting a merchandise link and purchasing merchandise, as shown in step 151. Alternatively, the user may visit the merchandise link simply to peruse the available merchandise without making a purchase.

The method may then proceed to step 113. In step 113, the computer system may permit or deny the affiliate system from operating the online link based on the detected actuation and digital activity. For example, as illustrated in FIG. 1B, the computer system may investigate online activity associated with the merchandise purchase, as illustrated in step 153. As shown in step 155, the computer system may then find the online activity legitimate, in which case a business which generated the purchased merchandise and an affiliate system associated with the purchased merchandise may settle upon a commission over the purchased merchandise.

Alternatively, as shown in step 157, the computer system may find the online activity fraudulent, in which case the computer system may block the online order from reaching settlement between the business and affiliate system. In some embodiments, the online activity may include click, affiliate, or order activity. In some further embodiments, cookie stuffing, auto browsing, or order abuse may be associated with the click, affiliate, or order activity. In a further embodiment, the click activity may be fraudulent if it occurs prior to a pre-determined threshold following generation of the online link. In an alternative further embodiment, the affiliate activity may be fraudulent if the click activity fails to meet a first pre-determined threshold or exceeds a second, separate pre-determined threshold. In a separate further embodiment, the order activity may be fraudulent if a number of orders of the selected merchandise item exceeds a first pre-determined threshold within a specific time period or if a total monetary amount associated with the order activity exceeds a second pre-determined threshold.

As shown in step 159, if the online activity is found to be fraudulent, the computer system may request proof that the affiliate system is legitimate. For example, the computer system may send a communication to the affiliate system requesting proof that the affiliate system is legitimate.

According to step 161, the computer system may then receive and evaluate the requested proof from the affiliate system. Evaluating the requested proof may comprise, for example, sending the requested proof to a computer system operated by a fraud operations system for evaluation. In some embodiments, the proof may be evaluated by an automated system (not pictured). One of ordinary skill will understand that other embodiments are possible as well.

Evaluating the requested proof may comprise evaluating the proof against one or more of the below rules. In some embodiments, the computer system evaluating the proof may comprise performing one of the below-described evaluations, while in other embodiments, the computer system evaluating the proof may comprise performing a plurality of the below-described evaluations.

In one aspect, evaluating the proof may comprise determining whether any collusion exists between an affiliate and a seller. In some embodiments, collusion may exist when more than twenty orders come from the same IP address over a fourteen-day period and are connected to a single affiliate. Alternatively, collusion may exist when more than twenty orders come from the same computer over the fourteen-day period and are connected to the single affiliate. Alternatively, collusion may exist when an order amount above $5,000 comes from the same IP address over a fourteen-day period and is connected to a single affiliate. Alternatively, collusion may exist when the order amount above $5,000 comes from the same computer over the fourteen-day period and is connected to the single affiliate. Alternatively, collusion may exist when more than fifteen orders are associated with the same mailing address over a fourteen-day period and are connected to a single affiliate. Alternatively, collusion may exist when an order amount above $2,500 is associated with the same mailing address over a fourteen-day period and is connected to a single affiliate. Alternatively, collusion may exist when a member count associated with the same IP address exceeds five members over a fourteen-day period and is connected to a single affiliate. Alternatively, collusion may exist when the member count associated with the same computer exceeds five members over the fourteen-day period and is connected to the single affiliate.

In another aspect, evaluating the proof may comprise assessing the click activity associated with a single affiliate to determine whether it is legitimate or fraudulent. In some embodiments, the click activity may be fraudulent if the single affiliate is linked to over 100 orders within a single month and the affiliate's click activity on a single day amounts to five times that of a daily average over a previous three-day period. Alternatively, the click activity may be fraudulent if the single affiliate is linked to over 100 orders within the single month and the affiliate's click activity associated with the same IP address exceeds 1,000 clicks in the single day. Alternatively, the click activity may be fraudulent if the single affiliate is linked to over 100 orders within the single month and the affiliate count associated with the same IP address exceeds ten in the single day. Alternatively, the click activity may be fraudulent if the single affiliate is linked to over 100 orders within the single month and the affiliate's click activity associated with the same computer exceeds 150 clicks in the single day. Alternatively, the click activity may be fraudulent if the single affiliate is linked to over 100 orders within the single month and the affiliate count associated with the same computer exceeds ten in the single day.

In another aspect, evaluating the proof may comprise assessing the click activity at an abnormal hour of the day to determine whether it is legitimate or fraudulent. In some embodiments, the click activity may be fraudulent if the single affiliate is linked to over 100 orders within the single month and the affiliate's click activity within a single hour amounts to twenty times that of an hourly average over a previous twenty-four hour period.

In another aspect, evaluating the proof may comprise assessing a bounce rate associated with a particular affiliate to evaluate legitimate or fraudulent activity. In some embodiments, activity may be fraudulent if the affiliate is linked both to over 100 orders within a single month and a bounce rate above 90%.

In another aspect, evaluating the proof may comprise assessing a particular affiliate's registration criteria to evaluate legitimate or fraudulent activity. In some embodiments, activity may be fraudulent if the affiliate is linked both to an order amount above $850 within a single month and more than 30% of domains that are unregistered.

In another aspect, evaluating the proof may comprise assessing the number of orders completed within a one-hour period. In some embodiments, activity may be fraudulent if the affiliate is linked to over 100 orders within a single month, an average of over ten orders within a single day, and over 80% of a total number of orders completed within a single hour. Alternatively, the activity may be fraudulent if the affiliate is linked to over 100 orders within the single month, an average of over ten orders within the single day, and less than 30% of the total number of orders completed within the single hour.

In another aspect, evaluating the proof may comprise assessing an actual conversion rate associated with a single affiliate relative to an average conversion rate. In some embodiments, an actual conversion rate that is too low may indicate poor affiliate performance. For example, the single affiliate may be associated with poor performance if it is linked both to an average of over ten orders within a single day and an actual conversion rate above 0% and below 0.5%. Alternatively, in some embodiments, an actual conversion rate that is too high may indicate unrealistically exceptional performance. For example, the single affiliate may be associated with unrealistically exceptional performance if it is linked both to an average of over ten orders within a single day and an actual conversion rate above 10%.

One of ordinary skill will understand that other embodiments or values are possible as well.

If the requested proof is deemed satisfactory, the computer system may then add the affiliate system to a database of legitimate affiliate systems, as shown in step 163. Alternatively, if the requested proof is deemed unsatisfactory, the computer system may permanently close the affiliate system's account, as illustrated in step 165. In further embodiments, if the affiliate system responds to the communication within a pre-determined time period, the affiliate system may be added to a white list of legitimate affiliate systems. In alternative embodiments, if the affiliate fails to respond to the communication within the pre-determined time period, the computer system may permanently block the affiliate system. In some embodiments, the computer system may send a communication to a second computer system operated by a fraud operations team requesting evaluation of the online activity. The second computer system may then respond to the request by indicating to the original computer system whether the online activity represents fraudulent or legitimate behavior. In some further embodiments, the communication may be based on the online activity.

In some embodiments, the computer system may reduce the likelihood that the digital activity is fraudulent by providing a database of affiliate systems for selection, wherein each affiliate system is categorized as fraudulent, suspicious, or normal, and selecting only normal affiliate systems to market the merchandise items.

Figure 2:
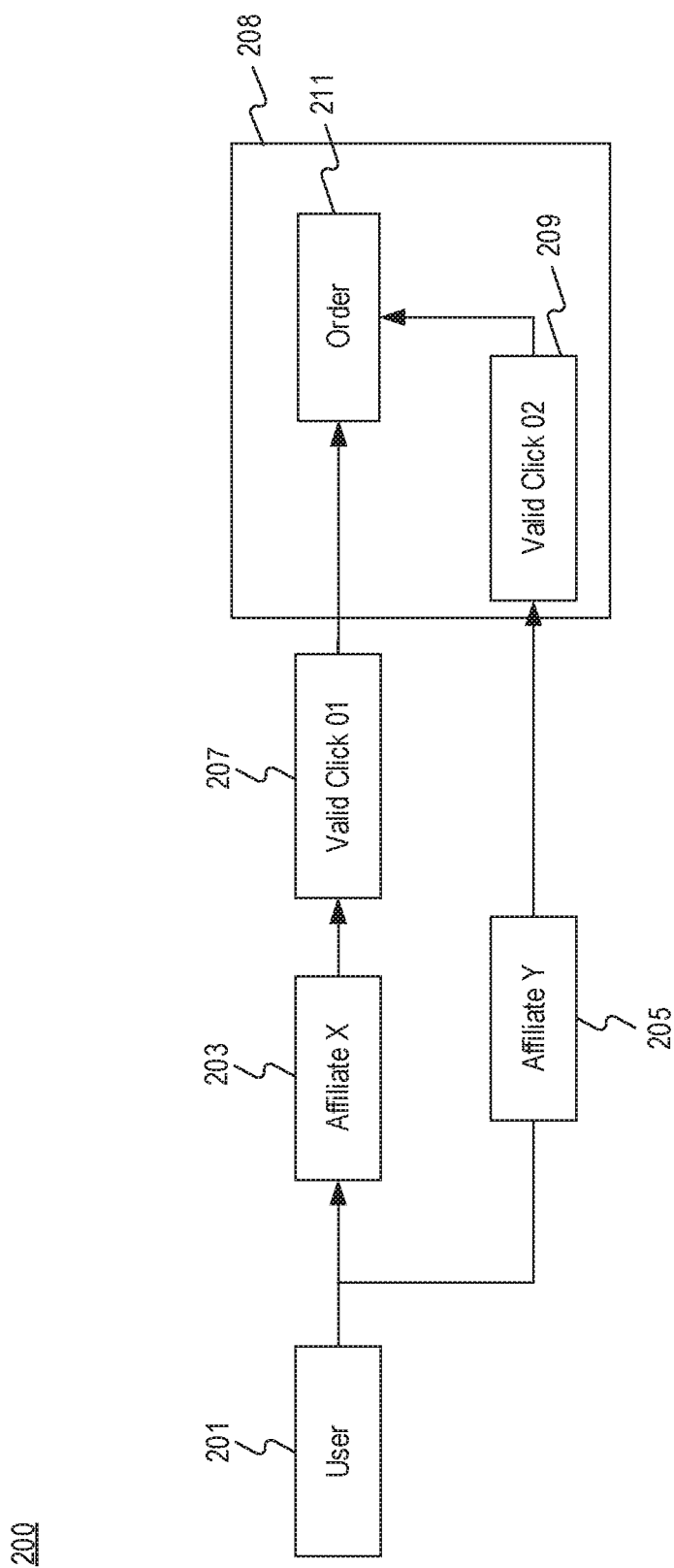
FIG. 2 depicts a schematic block diagram illustrating ordering of online merchandise by a user, wherein the online merchandise is associated with two affiliate systems, consistent with the disclosed embodiments.

FIG. 2 depicts a schematic block diagram illustrating an exemplary computerized method 200 wherein a user orders online merchandise associated with two affiliate systems, consistent with the disclosed embodiments. Method 200 begins at step 201. As shown in step 201, a user may make a valid order 211 of online merchandise via two, separate and valid click mechanisms 01 and 02. As shown in steps 207 and 209, the click mechanisms may be associated with two, separate affiliate systems X and Y (203, 205). In a preferred embodiment, the order 211 may be attributed to the valid click mechanism closest in time to the order, as shown in step 209. Thus, a business that generated the purchased merchandise may settle commission with affiliate system Y (205) associated with the valid click mechanism shown in step 209.

Figure 3:
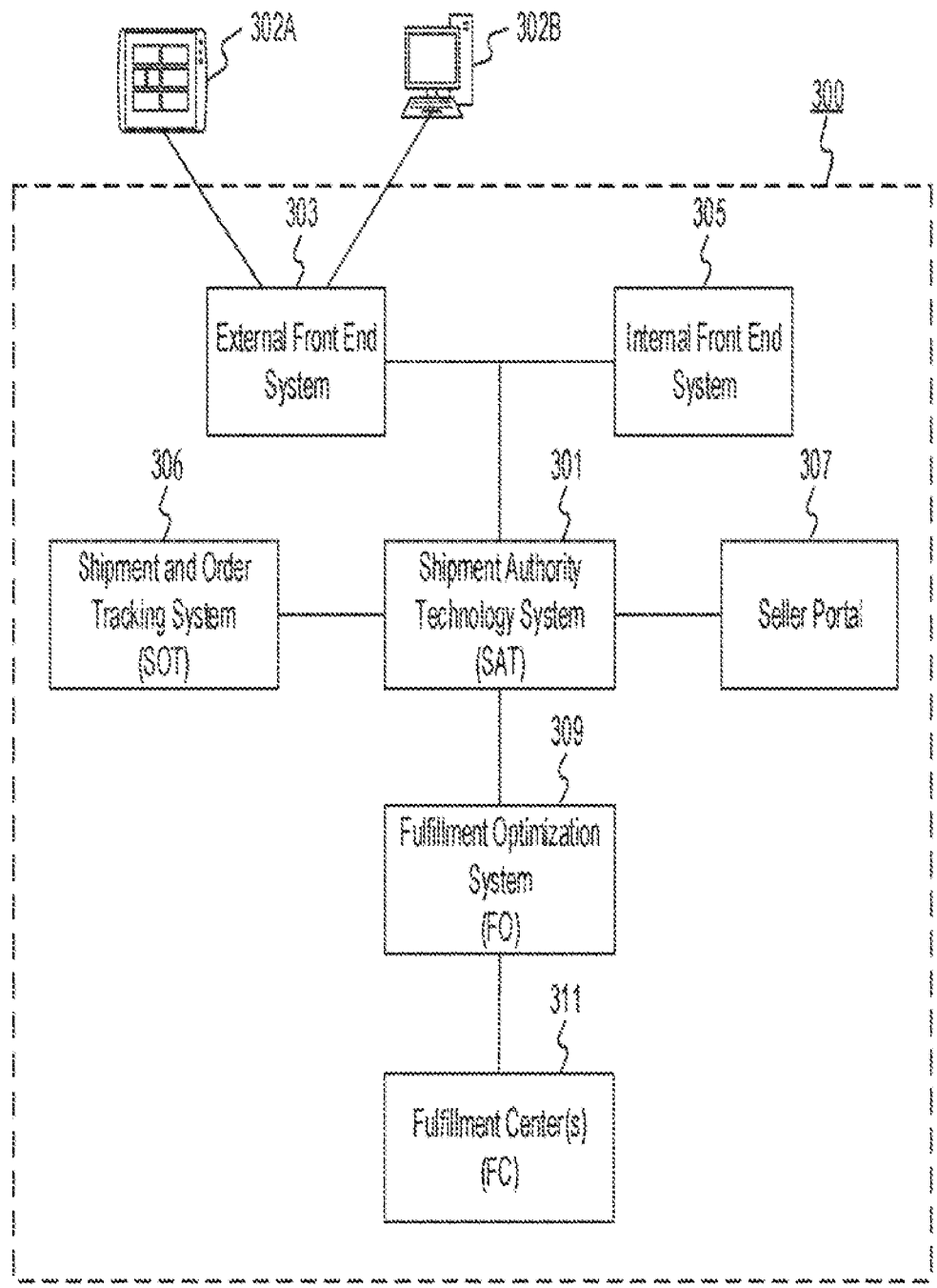
FIG. 3 is a schematic block diagram illustrating an exemplary embodiment of a network comprising computerized systems for communications enabling shipping, transportation, and logistics operations, consistent with the disclosed embodiments.

FIG. 3 shows a schematic block diagram 300 of an exemplary embodiment of a computerized system in which embodiments of the present disclosure may be implemented. In FIG. 3, system 300 is configured for enabling shipping, transportation, and logistics operations relating to an e-commerce marketplace. However, the present disclosure is not restricted to e-commerce systems and may also be implemented in a general search engine.

As illustrated in FIG. 3, system 300 may include a variety of constituent systems, which may be connected to one another via one or more networks. These constituent systems may also be connected to one another via direct connections, e.g., using direct data links. In the e-commerce marketplace shown in FIG. 3, the depicted systems include a shipment authority technology (SAT) system 301, an external front-end system 303, an internal front-end system 305, shipment and order tracking (SOT) system 306, seller portal 307, fulfillment optimization (FO) system 309, and fulfillment center (FC) 311.

In some embodiments, SAT system 301 may be implemented as a computer system that monitors the status of orders and deliveries in an e-commerce marketplace. For example, SAT system 301 may determine whether an order is past its promised delivery date (PDD) and may take appropriate action, including initiating a new order, reshipping the items in the non-delivered order, canceling the non-delivered order, initiating contact with the ordering customer, or the like. SAT system 301 may also act as a gateway between different devices in system 300, enabling communication (e.g., using store-and-forward or other techniques) between devices such as external front-end system 303 and FO system 309.

In some embodiments, internal front-end system 305 may be implemented as a computer system that enables internal users (e.g., employees of an organization that owns, operates, or leases system 300) to interact with one or more systems in system 300. For example, in embodiments where network 301 enables the presentation of systems to enable users to place an order for an item, internal front-end system 305 may be implemented as a web server that enables internal users to view diagnostic and statistical information about orders, modify item information, or review statistics relating to orders. For example, internal front-end system 305 may be implemented as a computer or computers running software such as the Apache HTTP Server, Microsoft Internet Information Services (IIS), NGINX, or the like. In other embodiments, internal front-end system 305 may run custom web server software designed to receive and process requests from systems or devices depicted in system 300 (as well as other devices not depicted), acquire information from databases and other data stores based on those requests, and provide responses to the received requests based on acquired information.

In some embodiments, internal front-end system 305 may include one or more of a web caching system, a database, a search system, a payment system, an analytics system, an order monitoring system, or the like. In one aspect, internal front-end system 305 may comprise one or more of these systems, while in another aspect, internal front-end system 305 may comprise interfaces (e.g., server-to-server, database-to-database, or other network connections) connected to one or more of these systems.

In some embodiments, seller portal 307 may be implemented as a computer system that enables sellers or other external entities to electronically communicate with one or more systems in system 300. For example, a seller may utilize a computer system (not pictured) to upload or provide product information, order information, contact information, or the like, for products that the seller wishes to sell through system 300 using seller portal 307.

In some embodiments, shipment and order tracking system 306 may be implemented as a computer system that receives, stores, and forwards information regarding the location of packages containing products ordered by customers (e.g., by a user using devices 302A-302B). In some embodiments, shipment and order tracking system 306 may request or store information from web servers (not illustrated) operated by shipping companies that deliver packages containing products ordered by customers.

Fulfillment center 311 represents one or more physical location that stores items for shipping to customers when ordered.

In some embodiments, fulfillment optimization (FO) system 309 may be implemented as a computer system that stores information for customer orders from other systems (e.g., external front-end system 303 and/or shipment and order tracking system 306). FO system 309 may also store information describing where particular items are held or stored. For example, certain items may be stored only in one fulfillment center 311, while certain other items may be stored in multiple fulfillment centers. In still other embodiments, certain fulfillment centers may be designed to store only a particular set of items (e.g., fresh produce or frozen products). FO system 309 stores this information as well as associated information (e.g., quantity, size, date of receipt, expiration date, etc.).

FO system 309 may also calculate a corresponding PDD (promised delivery date) for each product. In some embodiments, the PDD may be based on one or more factors. For example, FO system 309 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 311, which fulfillment center stores each product, expected or current orders for that product, or the like.

In some embodiments, FO system 309 may determine a PDD for each product on a periodic basis (e.g., hourly) and store it in a database for retrieval or sending to other systems (e.g., external front-end system 303, SAT system 301, shipment and order tracking system 306). In other embodiments, FO system 309 may receive electronic requests from one or more systems (e.g., external front-end system 303, SAT system 301, shipment and order tracking system 306) and calculate the PDD on demand.

In some embodiments, external front-end system 303 may be implemented as a computer system that enables external users to interface with an e-commerce marketplace. For example, external front-end system 303 may be implemented as a computer or computers running software such as the Apache HTTP Server, Microsoft Internet Information Services (IIS), NGINX, or the like.

In some embodiments, external front-end system 303 may be implemented as a web server that presents a graphical user interface (GUI) to enable users to place orders for items offered for sale in the e-commerce marketplace. In such an embodiment, the external front-end system 303 may receive search requests, presents item pages, and solicit payment information.

In other embodiments, external front-end system 303 may be implemented as a web server that presents a graphical user interface (GUI) to enable users to conduct electronic searches. In such embodiments, external front-end system 303 may run custom web server software designed to receive and process requests from external devices (e.g., mobile device 302A or computer 302B), acquire information from databases and other data stores based on those requests, and provide responses (e.g., a ranked listing of search results) based on the acquired information.

In some embodiments, external front-end system 303 may include one or more of a web caching system, a database, a search system, or a payment system. In one aspect, external front-end system 303 may comprise one or more of these systems, while in another aspect, such systems may be hosted elsewhere within system 300 and external front-end system 303 may include interfaces (e.g., server-to-server, database-to-database, or other network connections) to such systems.

FIGS. 4A, 4B, 4C, and 4D illustrate some operations of external front-end system 303. External front-end system 303 may receive information from systems or devices in system 300 for presentation and/or display on a graphical user interface (GUI). For example, external front-end system 303 may host or provide one or more web pages, including a Search Result Page (SRP) (e.g., FIG. 4A), a single detail page (SDP) (e.g., FIG. 4B), a cart page (e.g., FIG. 4C), and/or an order page (e.g., FIG. 4D).

A user device (e.g., using mobile device 302A or computer 302B) may navigate to external front-end system 303 and request a search by entering information into a search box. External front-end system 303 may request information from one or more systems in system 300. For example, external front-end system 303 may request information from FO System 309 that satisfies the search request.

External front-end system 303 may prepare an SRP (e.g., FIG. 4A) based on the information received in response to its query. The SRP may include information that satisfies the search request. For example, this may include pictures of products that satisfy the search request. The SRP may also include respective prices for each product, or information relating to enhanced delivery options for each product, PDD, weight, size, offers, discounts, or the like, as offered by the top-rated seller of the product (described below). External front-end system 303 may send the SRP to the requesting user device (e.g., via a network) for display on the user's GUI.

A user device may then select a product from the SRP, e.g., by clicking or tapping a user interface (e.g., using a mouse, pen, touchscreen, or other pointing device) or using another input device (e.g., a button or keyboard) to select a product represented on the SRP. In response to such an input, the user device may formulate a request for further information on the selected product and send it to external front-end system 303.

In response to such a selection, external front-end system 303 may request and receive further information regarding the selected product (e.g., from FO System 309). For example, this additional information may include information regarding the product's shelf life, country of origin, weight, size, handling instructions, or other information about the product. The information may also include recommendations for similar products (based on, for example, big data and/or machine learning analysis of past transactions by customers who bought this product and at least one other product), answers to frequently asked questions regarding the product, product reviews by other customers, manufacturer information, pictures, or the like.

In order to convey this information to the user, external front-end system 303 may prepare an SDP (Single Detail Page) (e.g., FIG. 4B) based on the received product information. The SDP may include an identification of the top-rated seller of the product (in this case, "Farm Imports Inc."), as well as the price (in this case 20,000 KRW), and promised delivery date (PDD) (in this case "Tomorrow (Wed) 11/28") offered by the top-rated seller. The PDD may represent an estimate of when a package containing the product will arrive at the user's desired location or a date by which the product is promised to be delivered at the user's desired location if ordered within a certain period, e.g., by 1:59:59 PM.

The SDP may also include other interactive elements such as a "Buy Now" button, a "Add to Cart" button, a quantity field, or the like, for use in executing an order. The SDP may further include a link 411 ("See Other Sellers") to a listing of other sellers of the same or similar products. Link 411 may be implemented using any of a number of graphical user interface (GUI) elements. For example, link 411 may be implemented as a button (including, e.g., a radio button or check box), an icon, or hyperlinked text, etc. As used herein, the term "hyperlink" should be understood to include any appropriate type of user-selectable GUI element.

In one embodiment, the sellers may be initially ordered based solely on the seller trust rating (STR). In another embodiment, the sellers may be initially ordered based on the total cost of the item (i.e., price plus shipping cost) offered by each seller, such that the seller(s) that offers to sell the product at the lowest total cost may be listed first. Where several sellers offer the product at the same total cost, the several sellers may be ordered based on the STR. In another embodiment, the sellers may be initially ordered based on the promised delivery date (PDD) indicated by each seller, such that the seller(s) that offers to deliver the product soonest may be listed first. Where several sellers offer the same PDD, the several sellers may be ordered based on the STR.

In yet another embodiment, the sellers may be initially ordered based on, e.g., the total cost of the item (i.e., price plus shipping cost) offered by each seller, such that the seller(s) that offers to sell the product at the lowest total cost may be listed at the top. Where several sellers offer the product at the same total cost, the several sellers may be ordered based on the PDD. And where several sellers offer the product at the same total cost and PDD, the several sellers may be ordered based on the STR.

In each case, the seller with the highest STR (in this case, "Farm Import Inc.") may be shown on the Single Detail Page (SDP) (FIG. 4B), so that customers may quickly conduct a transaction with the highest-rated seller.

Figure 4D:
FIG. 4D depicts a sample Order page that includes items from the virtual shopping cart along with information regarding purchase and shipping, along with interactive user interface elements, consistent with the disclosed embodiments.

External front-end system 303 may generate a Cart page (e.g., FIG. 4D). In some embodiments, the Cart page lists the products that the user has added to a virtual "shopping cart." A user device may request the Cart page by clicking on or otherwise interacting with an icon on the SRP, SDP, or other pages. In some embodiments, the Cart page may list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 303.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for regulating online merchandise link activity, the system comprising:
   a memory storing instructions; and
   at least one processor configured to execute the instructions to:
      maintain a set of items for online link processing, the set of items being associated with a website;
      select a first item from the set of items;
      receive an electronic request from a first affiliate system related to the first item;
      register the first affiliate system as associated with the first item;
      generate an online link associated with the first item and the registered first affiliate system;
      detect an actuation of the online link, the actuation being associated with digital activity; and
      based on the detected actuation and digital activity, permit or deny the first affiliate system from operating the online link;
         wherein permitting or denying the first affiliate system from operating the online link further comprises:
            when the online link is permitted to be operated, allowing a business which generated the first item and the first affiliate system to settle upon a commission associated with a purchase of the first item;
            and, when fraudulent behavior is detected, sending a communication to the first affiliate system requesting proof that the first affiliate system is legitimate, and determining whether any collusion exists between the first affiliate system and the business based on the proof.

2. The system of claim 1, wherein the digital activity includes cookie stuffing, auto browsing, or order abuse, associated with click, affiliate, or order activity.

3. The system of claim 2, wherein the click activity is deemed fraudulent if it occurs prior to a first pre-determined threshold following generation of the online link.

4. The system of claim 3, wherein the affiliate activity is deemed fraudulent if the click activity either fails to meet a second pre-determined threshold or exceeds a third pre-determined threshold.

5. The system of claim 2, wherein the order activity is deemed fraudulent if a number of orders of the first item exceeds a first pre-determined threshold within a specific time period or if a total monetary amount associated with the order activity exceeds a second pre-determined threshold.

6. The system of claim 2, wherein, if more than one click activity is associated with an order of the first item, the order of the first item is associated with the click activity closest in time to the order.

7. The system of claim 1, wherein the processor is further configured to execute the instructions to:
   reduce the likelihood that the digital activity is fraudulent by providing a database of affiliate systems for selection, wherein each affiliate system is categorized as fraudulent, suspicious, or normal; and
   select only normal affiliate systems to market the set of items.

8. The system of claim 1, wherein permitting or denying the first affiliate system from operating the online link further comprises:
   if the first affiliate system responds to the communication within a pre-determined time period, adding the first affiliate system to a white list of legitimate affiliate systems; or
   if the first affiliate system does not respond to the communication within the pre-determined time period, permanently blocking the first affiliate system.

9. A computer-implemented method for regulating online merchandise link activity, the method comprising:
   maintaining a set of items for online link processing, the set of items being associated with a website;
   selecting a first item from the set of items;
   receiving an electronic request from a first affiliate system related to the first item;
   registering the first affiliate system as associated with the first item;
   generating an online link associated with the first item and the registered first affiliate system;
   detecting an actuation of the online link, the actuation being associated with digital activity; and
   based on the detected actuation and digital activity, permitting or denying the first affiliate system from operating the online link;
      wherein permitting or denying the first affiliate system from operating the online link further comprises:
         when the online link is permitted to be operated, allowing a business which generated the first item and the first affiliate system to settle upon a commission associated with a purchase of the first item;

and, when fraudulent behavior is detected, sending a communication to the first affiliate system requesting proof that the first affiliate system is legitimate, and determining whether any collusion exists between the first affiliate system and the business based on the proof.

10. The computer-implemented method of claim 9, wherein the digital activity includes cookie stuffing, auto browsing, or order abuse, associated with click, affiliate, or order activity.

11. The computer-implemented method of claim 10, wherein the click activity is deemed fraudulent if it occurs prior to a first pre-determined threshold following generation of the online link.

12. The computer-implemented method of claim 11, wherein the affiliate activity is deemed fraudulent if the click activity either fails to meet a second pre-determined threshold or exceeds a third pre-determined threshold.

13. The computer-implemented method of claim 10, wherein the order activity is deemed fraudulent if a number of orders of the first item exceeds a first pre-determined threshold within a specific time period or if a total monetary amount associated with the order activity exceeds a second pre-determined threshold.

14. The computer-implemented method of claim 10, wherein, if more than one click activity is associated with an order of the first item, the order of the first item is associated with the click activity closest in time to the order.

15. The computer-implemented method of claim 9, further comprising:
reducing the likelihood that the digital activity is fraudulent by providing a database of affiliate systems for selection, wherein each affiliate system is categorized as fraudulent, suspicious, or normal; and
selecting only normal affiliate systems to market the set of items.

16. The computer-implemented method of claim 9, wherein
permitting or denying the first affiliate system from operating the online link further comprises:
if the first affiliate system responds to the communication within a pre-determined time period, adding the first affiliate system to a white list of legitimate affiliate systems; or
if the first affiliate system does not respond to the communication within the pre-determined time period, permanently blocking the first affiliate system.

17. A system for regulating online merchandise link activity, the system comprising:
a memory storing instructions; and
at least one processor configured to execute the instructions for:
maintain a set of items for online link processing, the set of items being associated with a website;
select a first item from the set of items;
receive an electronic request from a first affiliate system related to the first item;
register the first affiliate system as associated with the first item;
generate an online link associated with the first item and the registered first affiliate system;
detect an actuation of the online link, the actuation being associated with digital activity; and
based on the detected actuation and digital activity, permit or deny the first affiliate system from operating the online link;
wherein permitting or denying the first affiliate system from operating the online link further comprises:
when the online link is permitted to be operated, allowing a business which generated the first item and the first affiliate system to settle upon a commission associated with a purchase of the first item;
and, when fraudulent behavior is detected, sending a communication to the first affiliate system requesting proof that the first affiliate system is legitimate, and determining whether any collusion exists between the first affiliate system and the business based on the proof.

18. The system of claim 17, wherein the processor is further configured to execute the instructions to:
reduce the likelihood that the digital activity is fraudulent by providing a database of affiliate systems for selection, wherein each affiliate system is categorized as fraudulent, suspicious, or normal; and
select only normal affiliate systems to market the set of items.

* * * * *